US012587004B2

(12) United States Patent　　(10) Patent No.:　US 12,587,004 B2

Li et al.　　(45) Date of Patent:　Mar. 24, 2026

(54) LEAKAGE CURRENT PROTECTION DEVICE AND ELECTRICAL APPLIANCES EMPLOYING THE SAME

(71) Applicant: Chengli Li, Suzhou (CN)

(72) Inventors: Chengli Li, Suzhou (CN); Xiaoming Zhang, Suzhou (CN); Zenghui Lv, Suzhou (CN)

(73) Assignee: Chengli Li, Suzhou (CN)

( * ) Notice:　Subject to any disclaimer, the term of this patent is extended or adjusted under 35 U.S.C. 154(b) by 197 days.

(21) Appl. No.: 18/404,532

(22) Filed:　Jan. 4, 2024

(65)　　　Prior Publication Data

US 2025/0183650 A1　Jun. 5, 2025

(30)　　Foreign Application Priority Data

Dec. 4, 2023　(CN) .......................... 202323281972.6

(51) Int. Cl.
　　*H02H 3/16*　　　(2006.01)
(52) U.S. Cl.
　　CPC .................................... *H02H 3/16* (2013.01)
(58) Field of Classification Search
　　CPC ........... H02H 3/16; H02H 3/044; H02H 3/04; H02H 3/162; H01R 13/648; H01R 24/28; H01R 12/75

USPC ........................................................... 361/42
See application file for complete search history.

(56)　　　　References Cited

U.S. PATENT DOCUMENTS

| | | | |
|---|---|---|---|
| 2011/0122548 A1* | 5/2011 | Nakamura ................. | B60L 3/04 |
| | | | 361/622 |
| 2012/0048617 A1* | 3/2012 | Mihara ................. | B60L 3/0069 |
| | | | 174/77 R |
| 2018/0331465 A1* | 11/2018 | Li .......................... | H01R 11/07 |
| 2021/0194189 A1* | 6/2021 | Li .......................... | H05K 1/182 |

* cited by examiner

*Primary Examiner* — Danny Nguyen
(74) *Attorney, Agent, or Firm* — Chen Yoshimura LLP

(57)　　　　ABSTRACT

A leakage current protection device includes a first housing, an input assembly, an output assembly, a second housing detachably affixed to the first housing by a connecting assembly to form a holding chamber with the first housing, a leakage current protection module disposed in the holding chamber and coupled with the input and output assemblies, where the leakage current protection module includes a switch mechanism between the input and output assemblies and circuit components to detect leakage current signals and to drive the switch to disconnect the electrical connection between the input and output assemblies when detecting a leakage current signal. A cover plate is affixed to the first and/or second housing and covers the connecting assembly. The leakage current protection device is resistant to disassembly by the user and resulting performance degradation, and further improves the safety and convenience during use.

13 Claims, 7 Drawing Sheets

100

100

LEAKAGE CURRENT PROTECTION DEVICE AND ELECTRICAL APPLIANCES EMPLOYING THE SAME

BACKGROUND OF THE INVENTION

This invention relates to electrical devices, in particular, it relates to a leakage current protection device and electrical appliances employing the same.

With the advancement of technology and the improvement of living standards, consumers are paying more and more attention to the safety of household appliances, and many household appliances are now equipped with leakage current protection devices. Most conventional leakage current protection devices are installed with screws, and the screw holes are exposed on the surface of the device. Users can easily disassemble the device, which can affect its performance and even cause the device to malfunction, and result in the inability to protect the user's personal safety during normal use. In addition, the waterproofness of such device is also poor, and water may seep into the interior of the device through the screw holes, posing certain safety hazards and potentially causing danger.

SUMMARY OF THE INVENTION

To solve the above problems, in a first aspect, the present invention provides a leakage current protection device, which includes: a first housing; an input assembly; an output assembly; a second housing, removably affixed to the first housing by a connecting assembly, and configured to cooperate with the first housing to form a holding chamber; a leakage current protection module, disposed within the holding chamber and electrically coupled to the input assembly and output assembly, the leakage current protection module including: a switch mechanism electrically coupled between the input assembly and the output assembly and configured to control an electrical connection between the input assembly and the output assembly; and circuit components configured to detect a leakage current signal and to drive the switch mechanism to disconnect the electrical connection in response to detecting the leakage current signal; and a cover plate, affixed to the first housing and/or the second housing and covering the connecting assembly.

In some embodiments, the cover plate is located on a side of the second housing away from the first housing.

In some embodiments, the cover plate is affixed to the first housing and/or the second housing by at least one of: snap connections, soldering, and adhesive bonding.

In some embodiments, the first housing and/or the second housing includes an opening, wherein a portion of the output assembly extends into the holding chamber through the opening, the leakage current protection device further comprising: a wire pressing block disposed in the holding chamber and affixed to the first housing and/or the second housing, and configured to hold a part of the output assembly in the holding chamber.

In some embodiments, the output assembly includes a power cord and a strain relief disposed outside of a portion of the power cord, wherein an end of the power cord and an end of the strain relief extend into the holding chamber through the opening.

In some embodiments, the end of the strain relief includes a first fixing portion, and the wire pressing block includes a second fixing portion corresponding in position to the first fixing portion, configured to cooperate with the first fixing portion to hold the strain relief in the holding chamber.

In some embodiments, the first fixing portion includes a groove, and the second fixing portion includes a slot with a protruding edge that fits in the groove.

In some embodiments, the first housing includes a third fixing portion on a side near the second housing, and the wire pressing block includes a fourth fixing portion corresponding in position to the third fixing portion, wherein the third fixing portion and the fourth fixing portion are configured to cooperate with the each other to hold the end of the power line in the holding chamber.

In some embodiments, the third fixing portion includes at least one first compression rib, and the fourth fixing portion includes at least one second compression rib, and wherein the end of the power cord is clamped between the first compression rib and the second compression rib.

In some embodiments, the connecting assembly includes at least one screw, bolt, and/or rivet.

In some embodiments, the second housing has at least one first through-hole, and the cover plate includes at least one second through-hole corresponding in position to the first through-hole, wherein one end of the input assembly is electrically coupled to the leakage current protection module and disposed in the holding chamber, and another end of the input assembly extends through the at least one first through-hole and the at least one second through-hole and extends outside of the cover plate.

In some embodiments, the input assembly includes at least one plug blade.

In some embodiments, the first housing further includes a reset button and a test button, wherein the reset button is operable to reset the leakage current protection module, and the test button is operable to test a protection function of the leakage current protection module.

In another aspect, the invention provides an electrical appliance, which includes: an electrical load; and the leakage current protection device according to any of the above embodiments, coupled between a power supply and the load and configured to supply power to the load.

The leakage current protection device according to embodiments of the present invention is resistant to disassembly by the user and avoids related performance issues, and further improves the safety and convenience of use. In addition, the leakage current protection device has a simple structure, and is low cost and safe.

BRIEF DESCRIPTION OF DRAWINGS

Preferred embodiments of the present invention are described with reference to the drawings. These drawings explain the embodiments and their operating principle, and only illustrate structures that are necessary to the understanding of the invention. These drawings are not to scale. In the drawings, like features are designated by like reference symbols. In the block diagrams, lines between blocks represent electrical or magnetic coupling of the blocks; the absence of lines between blocks does not mean the lack of coupling.

DETAILED DESCRIPTION OF THE INVENTION

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

Before describing the embodiments, some terms used in this disclosure are defined here to help the reader better understand this disclosure.

In this disclosure, terms such as "connect", "couple", "link" etc. should be understood broadly, without limitation to physical connection or mechanical connection, but can include electrical connection, and can include direct or indirection connections. Terms such as "a" and "one" do not limit the quantity, and refers to "at least one".

In the descriptions below, terms such as "including" are intended to be open-ended and mean "including without limitation", and can include other contents. "Based on" means "at least partly based on." "An embodiment" means "at least one embodiment." "Another embodiment" means "at least another embodiment," etc. In this disclosure, the above terms do not necessarily refer to the same embodiments. Further, the various features, structures, materials or characteristics may be suitably combined in any of the one or more embodiments. Those of ordinary skill in the art may combine the various embodiments and various characteristics of the embodiments described herein when they are not contrary to each other.

Figure 1:
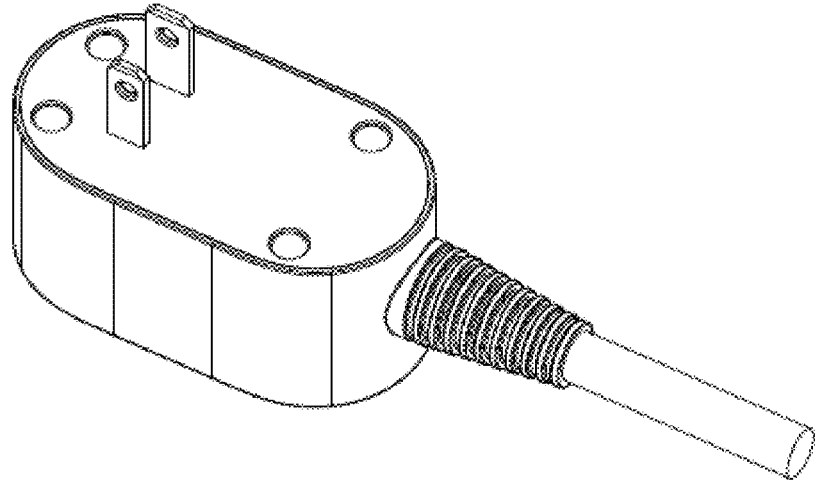
FIG. 1 shows an exterior view of a conventional leakage current protection device.

FIG. 1 shows an overall view of a conventional leakage current protection device. As shown in FIG. 1, in the conventional leakage current protection device, the screw holes are exposed on the surface of the leakage current protection device. It is easy for users to disassemble the device, which can have an impact on the performance of the device, even causing it to malfunction, and reducing its ability to protect the personal safety of the users. In addition, the waterproof performance of this leakage current protection device is also poor, and water may seep into the interior of the device through the screw holes, posing certain safety hazards and potentially causing danger.

Embodiments of the present invention provide a leakage current protection device, in which the first housing and the second housing are connected through connectors, and the leakage current protection module is placed in a cavity formed by the first housing and the second housing, and a cover plate is provided to cover the connector, to avoid the impact on device performance due to user disassembly, and further improve the safety and convenience of device use. In addition, the leakage current protection device has a simple structure, and is low cost and safe.

The structure of the leakage current protection device according to embodiments of the present invention is described with reference to FIGS. 2*a* to 9.

Figure 2A:
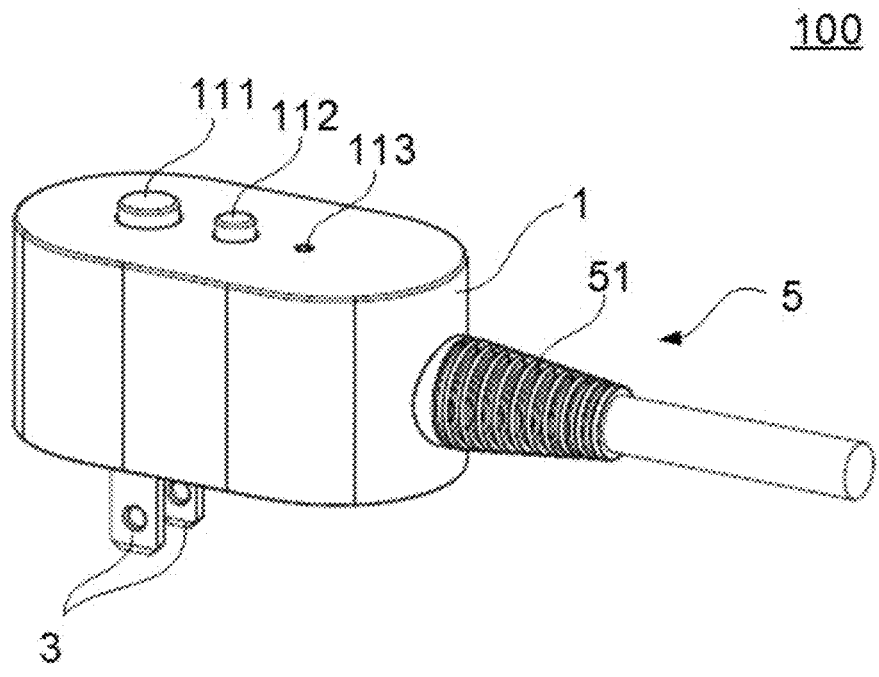
FIGS. 2a-2b show exterior views from different viewing angles of a leakage current protection device according to an embodiment of the present invention.
Figure 2B:
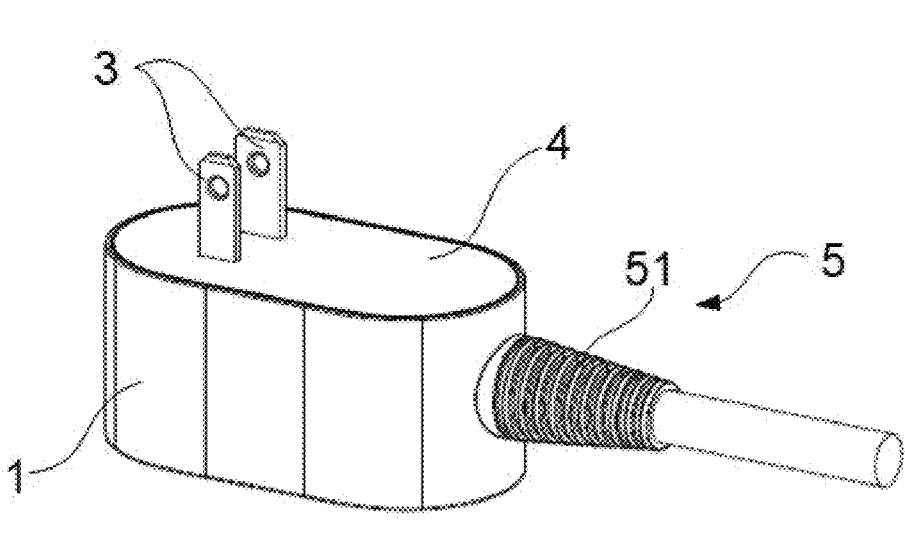
Figure 3:
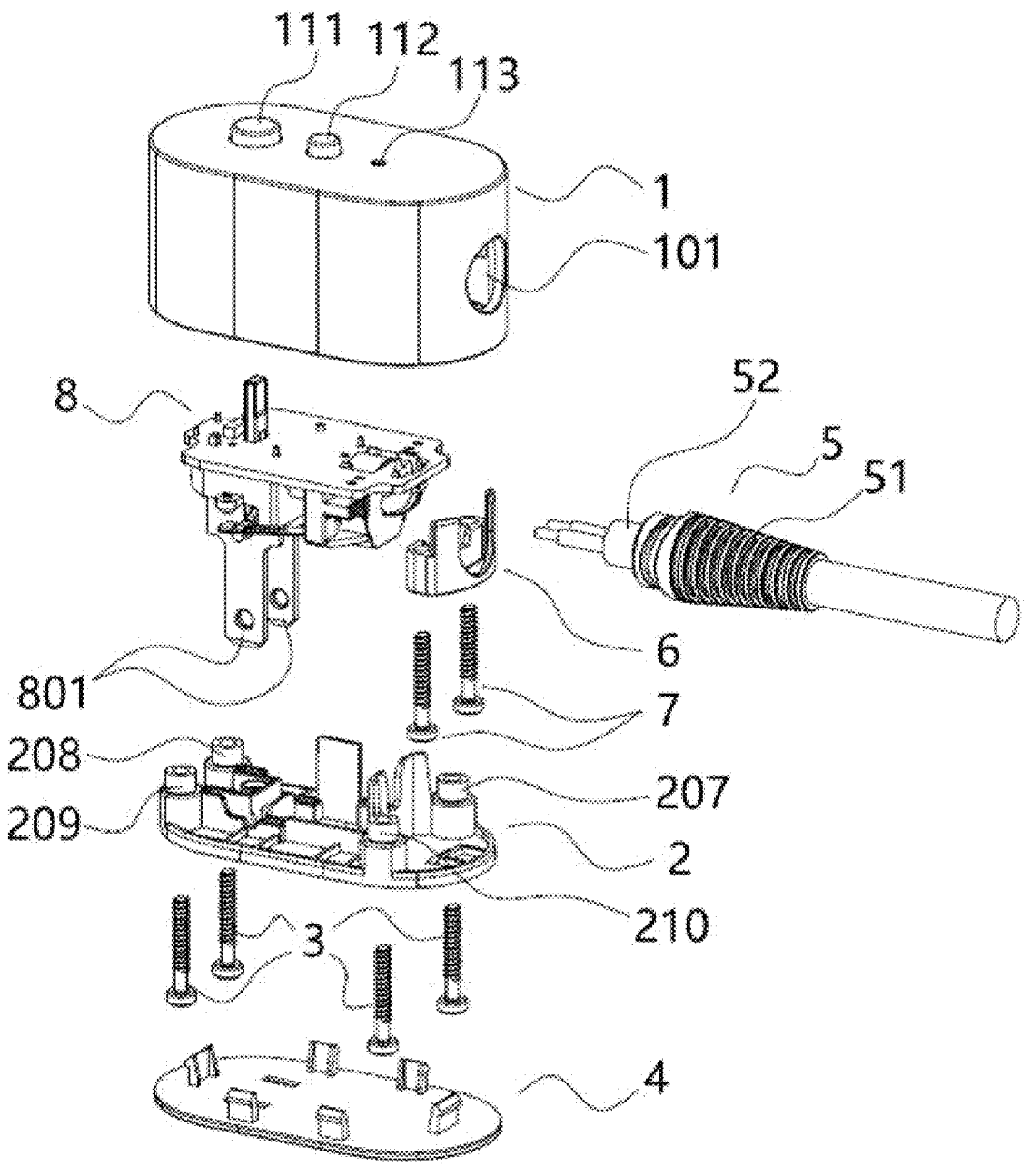
FIG. 3 is an exploded view of the leakage current protection device according to the embodiment.

Referring to FIGS. 2*a*-2*b* and 3, FIGS. 2*a*-2*b* illustrate the overall appearance of the leakage current protection device in different viewing directions, and FIG. 3 shows a schematic diagram of the assembly and disassembly of the leakage current protection device.

As shown in FIGS. 2*a*-2*b* and 3, the leakage current protection device 100 includes a first housing 1, a second housing 2, an input assembly 3, a cover plate 4, an output assembly 5, and a leakage current protection module 8. The second housing 2 is detachably fixed to the first housing 1 through a connecting assembly 9, and forms a holding chamber with the first housing 1. In this embodiment, the connecting assembly 9 includes four screws. In other embodiments, the connecting assembly 9 may also include other quantities of screws, bolts, and/or rivets. The leakage current protection module 8 is accommodated in a holding chamber formed by the first housing 1 and the second housing 2, and is coupled with the input assembly 3 and the output assembly 5. The leakage current protection module 8 includes a switch mechanism (e.g., contact arms moveable by a solenoid) and circuit components (not shown in the figures). The switch mechanism is disposed between the input assembly 3 and the output assembly 5, and is configured to control the electrical connection between input assembly 3 and output assembly 5. The circuit components are configured to detect leakage current signals (such as the leakage current signal on the power line 52 of the output assembly 5) and to drive the switch mechanism to disconnect the electrical connection in response to detecting the leakage current signal. The cover plate 4 is fixed to the first housing 1 and/or the second housing 2 and covers the connecting assembly 9.

Figure 4A:
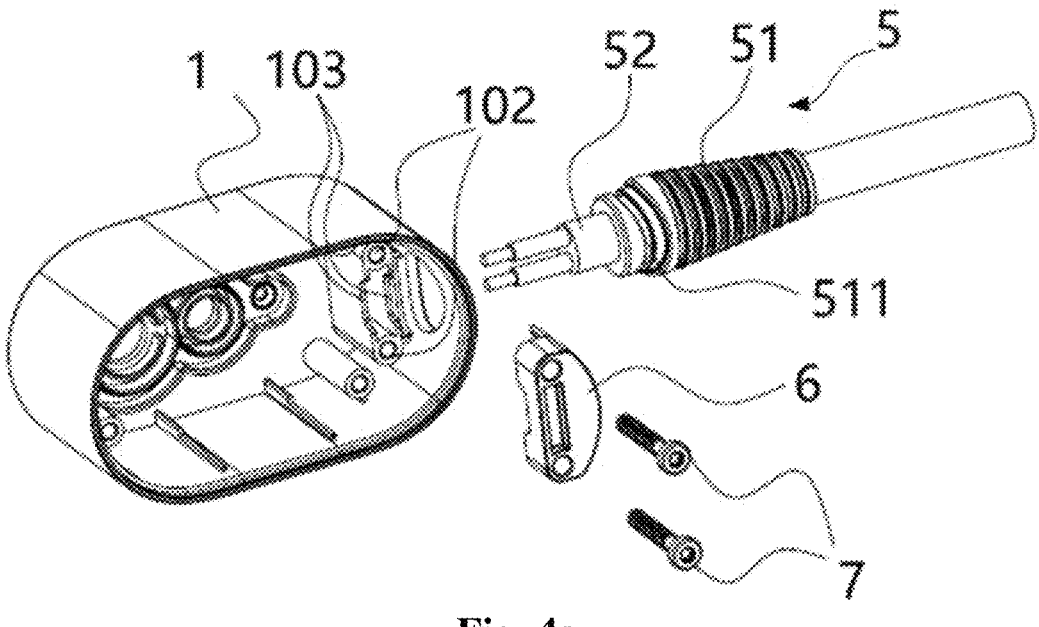
FIGS. 4*a*-4*b* are exploded views from different viewing angles of the first shell, output assembly and wire pressing block of the leakage current protection device according to the embodiment.
Figure 4B:
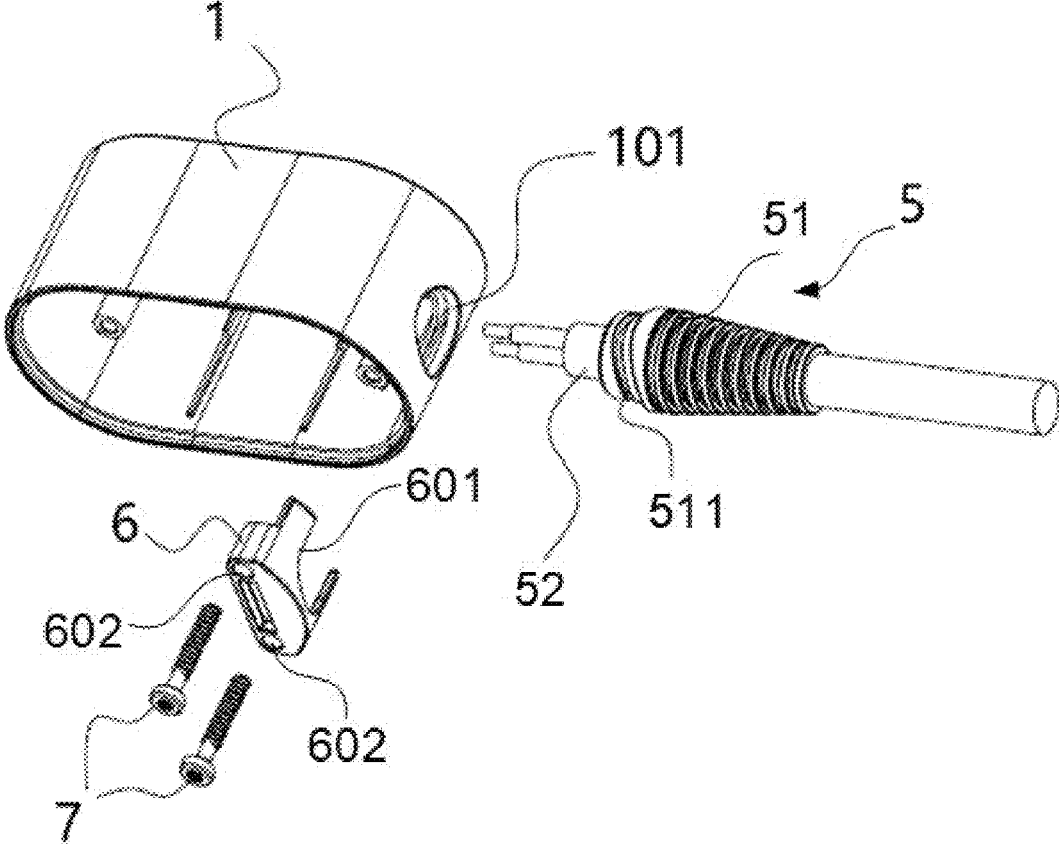
Figures 5, 6A:
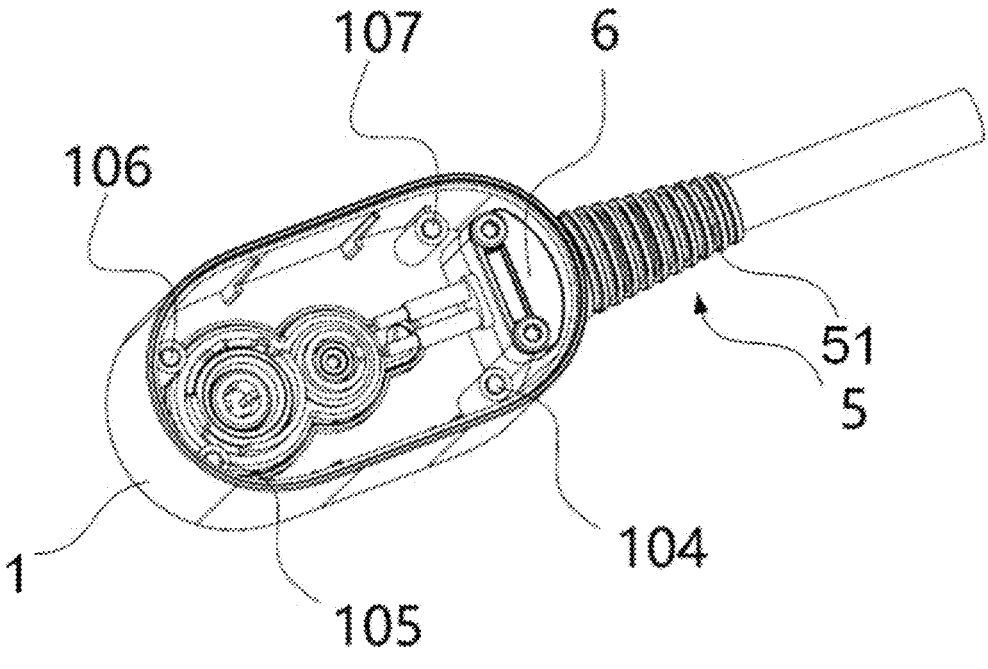
FIG. 5 shows the assembled first shell, output assembly and wire pressing block of the leakage current protection device according to the embodiment.
FIGS. 6*a*-6*b* show the structure of the wire pressing block from different viewing angles.
Figure 6B:
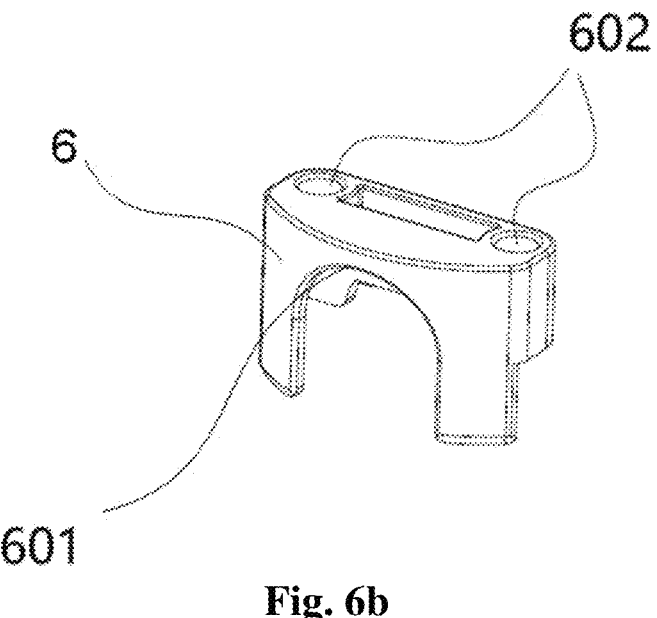

The assembly process of the first housing 1 and output assembly 5 of the leakage current protection device 100 is described with reference to FIGS. 4*a*-6*b*. FIGS. 4*a*-4*b* are exploded views from different viewing angles of the first shell, output assembly and wire pressing block of the leakage current protection device. FIG. 5 shows the assembled first shell, output assembly and wire pressing block. FIGS. 6*a*-6*b* show the structure of the wire pressing block from different viewing angles.

In this embodiment, the leakage current protection device 100 further includes a wire pressing block 6. The first housing 1 is provided with an opening 101, and a portion of the output assembly 5 extends into the holding chamber through the opening 101. The wire pressing block 6 is used to hold a part of the output assembly 5 in the holding chamber. The output assembly 5 includes a power cord 52 and a strain relief 51 disposed outside of a portion of the power cord 52. One end of the strain relief 51 is provided with a first fixing portion 511, and the wire pressing block 6 includes a second fixing portion 601 corresponding to the position of the first fixing portion 511, configured to cooperate with the first fixing portion 511 to hold the strain relief 51. In the illustrated embodiment, the first fixing portion 511 is a groove, and the second fixing portion 601 is a U shaped slot with a protruding edge that fits in the groove. In other embodiments, the first fixing portion 511 and the second fixing portion 601 may also be other forms of fixed components, as long as the strain relief 51 can be securely fixed. A third fixing portion 103 is provided on one side of the first housing 1 near the second housing 2 (the inner side in FIG. 4a), and a fourth fixing portion 603 is provided on the wire pressing block 6 corresponding to the position of the third fixing portion 103, configured to cooperate with the third fixing portion 103 to hold the power line 52. In the illustrated embodiment, the third fixing portion 103 includes two first compression ribs, and the fourth fixing portion 603 includes two second compression ribs and the power cord 52 is clamped between them.

When assembling the first housing 1 and the output assembly 5, one end of the power cord 52 along with the strain relief 51 is passed through the opening 101 on the first housing 1 and into the holding chamber. One end of the power cord 52 is clamped between the first compression ribs 103 and the second compression ribs 603, while the edge of the second fixing slot 601 of the wire pressing block 6 is pressed into the groove 511, preventing the strain relief 51 from being pulled out from the opening 101. The wire pressing block 6 are also provide with two screw holes 602. Two screws 7 pass through the screw holes 602 to affix the wire pressing block 6 to two screw receiving columns 102 of the first housing 1. When the screws 7 of the wire pressing block are tightened and the wire pressing block 6 is firmly affixed to the first housing 1, the first compression ribs 103 on the inner side of the first housing 1 and the second compression ribs 603 on the wire pressing block 6 cooperate to press the end of the power line 52 and keep it in place. Meanwhile, the edge of the second fixing slot 601 on the wire pressing block 6 is inserted into the groove 511, so as to affix the end of the strain relief 51. Therefore, the end of the power cord 52 along with the strain relief 51 are affixed in the holding chamber.

The assembly process of the first housing 1 and the second housing 2 is described below with reference to FIGS. 3 and 5. In this embodiment, the input assembly 3 includes a pair of plug blades, fixedly installed on the leakage current protection module 8 and electrically connected to the leakage current protection module 8. The leakage current protection module 8 is placed in the holding chamber formed by the first housing 1 and the second housing 2, and connected electrically to the output assembly 5. The second housing 2 has a pair of first through-holes 211 corresponding to the position of the plug blades 3. When installing the second housing 2 to the first housing 1, the pair of first through-holes 211 is aligned with the plug blades 3, so that the plug blades 3 pass through the first through-hole 211 and extend to the outside of the second housing 2. The second housing 2 includes four screw holes 207, 208, 209, and 210, corresponding to the positions of four screw receiving columns 104, 105, 106, and 107 on the inner side of the first housing 1. Four screws 9 pass through the screw holes 207, 208, 209, and 210 to secure the second housing 2 to the screw receiving columns 104, 105, 106, and 107 of the first housing 1.

Figure 7:
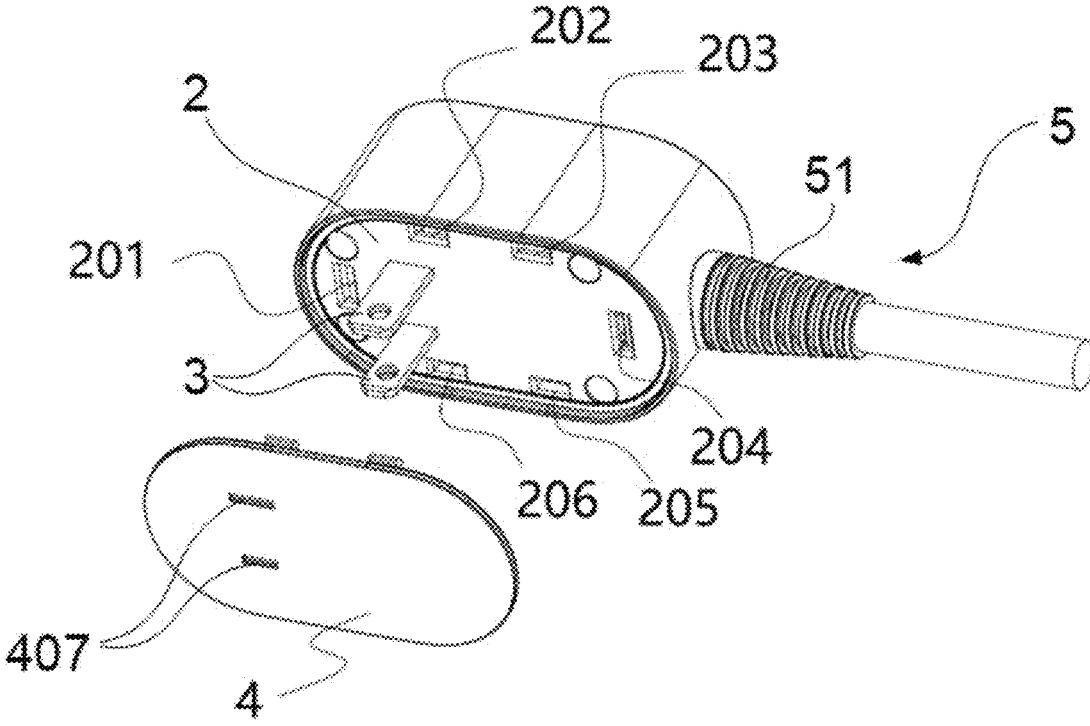
FIG. 7 is an exploded view of the cover plate and the second shell of the leakage current protection device according to the embodiment.
Figure 8:
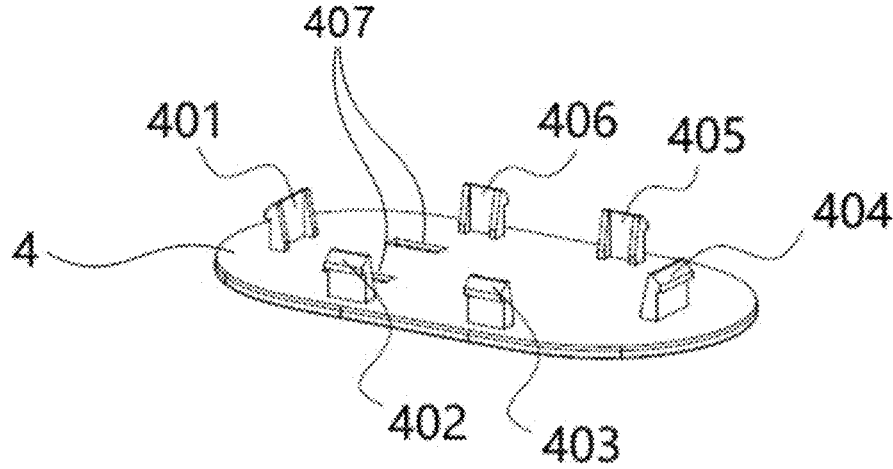
FIG. 8 shows the structure of the cover plate of the leakage current protection device according to the embodiment.
Figure 9:
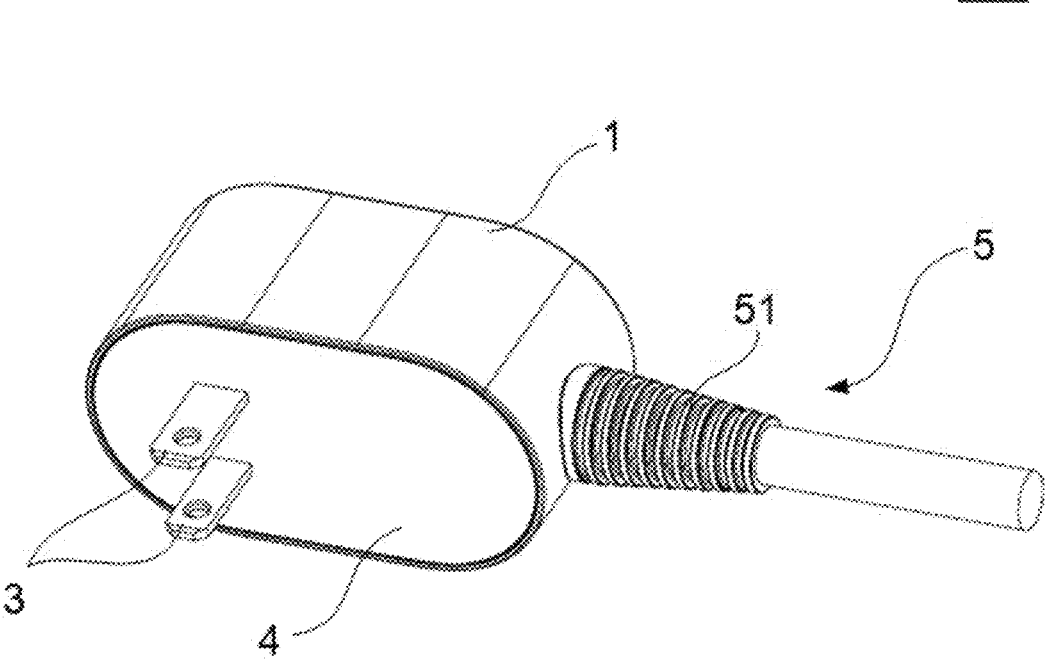
FIG. 9 shows the assembled cover plate and the second shell of the leakage current protection device according to the embodiment.

Refer to FIGS. 7-9. FIG. 7 is an exploded view of the cover plate and the second shell of the leakage current protection device. FIG. 8 shows the structure of the cover plate. FIG. 9 shows the assembled cover plate and the second shell.

The cover plate 4 is equipped with six resilient snap hooks 401, 402, 403, 404, 405, and 406, as well as a pair of second through-holes 407. The second housing 2 is equipped with six snap hook receiving slots 201, 202, 203, 204, 205, and 206 corresponding to the position of the snap hooks. When assembling the cover plate 4 to the second housing 2, the pair of second through-holes 407 are align with the plug blades 3, so that the plug blades 3 pass through the second through-holes 407 and extend to the outside of the cover plate 4. The plug blade 3 is configured to be plugged into a power receptor. Meanwhile, the six snap hooks 401, 402, 403, 404, 405, and 406 are engaged with the snap hook receiving slots 201, 202, 203, 204, 205, and 206, respectively. At this point, as shown in FIG. 9, the cover plate 4 covers the screws 9 and screw holes 207, 208, 209, and 210 of the housing, so that they are be exposed on the surface of the device. Because there is no detachable mechanism on the surface of the device, it resists disassembly by the user and can avoid the related impact on its performance, and improve the safety and convenience of the device.

In this embodiment, the cover plate 4 is provided on the side of the second housing 2 away from the first housing 1, because the screw holes 207, 208, 209, and 210 are provided on the second housing 2. In other embodiments, if the screw holes are disposed on the first housing 1, and the screws affix the first housing 1 and the second housing 2 from the direction of the first housing 1, then the cover plate 4 may be located on the side of the first housing 1 away from the second housing 2 (shown as the upper side of the first housing 1 in FIG. 3).

In this embodiment, the cover plate 4 is fixed to the second housing 2 by the resilient snap hooks and corresponding receiving slots. In other embodiments, the cover plate 4 may be affixed to the second housing 2 by at least one of the following methods: snap connections, soldering, and adhesive bonding. In embodiments where soldering and/or adhesive bonding are used, the waterproof performance of the leakage current protection device 100 is further increased.

In the illustrated embodiment, the cover plate 4 is affixed to the second housing 2. In other embodiments, the cover plate 4 may be affixed to the first housing 1 or to both the first housing 1 and the second housing 2 by any one or more combinations of the above-mentioned fixing methods. For example, the cover plate 4 may be affixed to the second housing 2 by a snaps, and or affixed to the first housing 1 by soldering.

In addition, as shown in FIGS. 2a and 3, the surface of the first housing 1 is further provided with a reset button 111, a test button 112, and a status indicator light 113. The reset button 111 may be used to operate the leakage current protection module 8 to reset it, so that the leakage current protection device 100 is in a reset state (i.e. input assembly 3 and output assembly 5 are electrically connected). The test button 112 is used to test the leakage current protection function of the leakage current protection device 100. When the leakage current protection device 100 is in the reset state and connected to the power source, if the test button 112 is depressed, a simulated leakage current signal is generated in the leakage current protection module 8. If the leakage current protection module 8 is functioning normally, its circuit components detect the leakage current signal and drive the switch mechanism to disconnect the electrical connection between input assembly 3 and the output assembly 5. If the electrical connection is not disconnected in response to depressing the test button, it indicates that the leakage current protection device 100 has malfunctioned and lost its leakage current protection function. The on and off of the status indicator light 113 may be set as needed to alert or remind the users, for example, it emits a light when the circuit component of leakage current protection module 8 detects a leakage current signal.

Other additional embodiments of the present invention provide an electrical appliance, which includes an electrical load, and leakage current protection device according to any of the above embodiments, coupled between a power supply and the load to supply power to the load.

While the present invention is described above using specific examples, these examples are only illustrative and do not limit the scope of the invention. It will be apparent to those skilled in the art that various modifications, additions and deletions can be made to the leakage current protection device of the present invention without departing from the spirit or scope of the invention.

The invention claimed is:

1. A leakage current protection device, comprising:
a first housing;
an input assembly;
an output assembly;
a second housing, removably affixed to the first housing by a connecting assembly, and configured to cooperate with the first housing to form a holding chamber;
a leakage current protection module, disposed within the holding chamber and electrically coupled to the input assembly and output assembly, the leakage current protection module including:
a switch mechanism electrically coupled between the input assembly and the output assembly and configured to control an electrical connection between the input assembly and the output assembly; and
circuit components configured to detect a leakage current signal and to drive the switch mechanism to disconnect the electrical connection in response to detecting the leakage current signal; and
a cover plate, affixed to the first housing and/or the second housing and covering the connecting assembly,
wherein the second housing has at least one first through-hole, and the cover plate includes at least one second through-hole corresponding in position to the first through-hole, wherein one end of the input assembly is electrically coupled to the leakage current protection module and disposed in the holding chamber, and another end of the input assembly extends through the at least one first through-hole and the at least one second through-hole and extends outside of the cover plate.

2. The leakage current protection device of claim 1, wherein the cover plate is located on a side of the second housing away from the first housing.

3. The leakage current protection device of claim 1, wherein the cover plate is affixed to the first housing and/or the second housing by at least one of: snap connections, soldering, and adhesive bonding.

4. The leakage current protection device of claim 1, wherein the first housing and/or the second housing includes an opening, wherein a portion of the output assembly extends into the holding chamber through the opening, the leakage current protection device further comprising:
a wire pressing block disposed in the holding chamber and affixed to the first housing and/or the second housing, and configured to hold a part of the output assembly in the holding chamber.

5. The leakage current protection device of claim 4, wherein the output assembly includes a power cord and a strain relief disposed outside of a portion of the power cord, wherein an end of the power cord and an end of the strain relief extend into the holding chamber through the opening.

6. The leakage current protection device of claim 5, wherein the end of the strain relief includes a first fixing portion, and the wire pressing block includes a second fixing portion corresponding in position to the first fixing portion, configured to cooperate with the first fixing portion to hold the strain relief in the holding chamber.

7. The leakage current protection device of claim 6, wherein the first fixing portion includes a groove, and the second fixing portion includes a slot with a protruding edge that fits in the groove.

8. The leakage current protection device of claim 5, wherein the first housing includes a third fixing portion on a side near the second housing, and the wire pressing block includes a fourth fixing portion corresponding in position to the third fixing portion, wherein the third fixing portion and the fourth fixing portion are configured to cooperate with the each other to hold the end of the power line in the holding chamber.

9. The leakage current protection device of claim 8, wherein the third fixing portion includes at least one first compression rib, and the fourth fixing portion includes at least one second compression rib, and wherein the end of the power cord is clamped between the first compression rib and the second compression rib.

10. The leakage current protection device of claim 1, wherein the connecting assembly includes at least one screw, bolt, and/or rivet.

11. The leakage current protection device of claim 1, wherein the input assembly includes at least one plug blade.

12. The leakage current protection device of claim 1, wherein the first housing further includes a reset button and a test button, wherein the reset button is operable to reset the leakage current protection module, and the test button is operable to test a protection function of the leakage current protection module.

13. An electrical appliance, comprising:
an electrical load; and
the leakage current protection device of claim 1, coupled between a power supply and the load and configured to supply power to the load.

* * * * *